(12) United States Patent
Nanda et al.

(10) Patent No.: US 11,281,673 B2
(45) Date of Patent: Mar. 22, 2022

(54) DATA PIPELINE FOR SCALABLE ANALYTICS AND MANAGEMENT

(71) Applicant: Parallel Wireless, Inc., Nashua, NH (US)

(72) Inventors: Nihar Nanda, Acton, MA (US); Steven Paul Papa, Windham, NH (US)

(73) Assignee: Parallel Wireless, Inc., Nashua, NH (US)

( * ) Notice: Subject to any disclaimer, the term of this patent is extended or adjusted under 35 U.S.C. 154(b) by 313 days.

(21) Appl. No.: 16/271,778

(22) Filed: Feb. 8, 2019

(65) Prior Publication Data

US 2019/0243836 A1 Aug. 8, 2019

Related U.S. Application Data

(60) Provisional application No. 62/739,638, filed on Oct. 1, 2018, provisional application No. 62/628,229, filed on Feb. 8, 2018.

(51) Int. Cl.
*G06F 16/2455* (2019.01)
*G06F 16/28* (2019.01)
*G06F 16/25* (2019.01)

(52) U.S. Cl.
CPC ...... *G06F 16/24568* (2019.01); *G06F 16/258* (2019.01); *G06F 16/288* (2019.01)

(58) Field of Classification Search
CPC .............. G06F 16/2455; G06F 16/258; G06F 16/24568; G06F 6/288
USPC ........................................................ 707/603
See application file for complete search history.

(56) References Cited

U.S. PATENT DOCUMENTS

| | | |
|---|---|---|
| 8,510,426 B2 | 8/2013 | Mercuri |
| 8,532,820 B1 | 9/2013 | Sampath |
| 8,589,481 B2 | 11/2013 | Das et al. |
| 8,620,879 B2 | 12/2013 | Cairns |
| 8,838,556 B1 | 9/2014 | Reiner et al. |
| 9,141,908 B1 | 9/2015 | Reiner et al. |
| 9,152,666 B2 * | 10/2015 | Lin ................... G06F 16/2343 |
| 9,456,011 B1 | 9/2016 | Nick et al. |
| 9,477,691 B1 | 10/2016 | Reiner et al. |
| 9,563,486 B1 * | 2/2017 | Narsude ................ G06F 16/258 |
| 9,875,440 B1 | 1/2018 | Commons |

(Continued)

OTHER PUBLICATIONS

Martin Backstrom, "Drive Profitability Further with Analytics", Ericsson Research Blog, Research, Telefonaktiebolaget LM Ericsson, Nov. 25, 2016.

(Continued)

*Primary Examiner* — Shahid A Alam
(74) *Attorney, Agent, or Firm* — Michael Y. Saji; David W. Rouille

(57) ABSTRACT

Systems and methods are disclosed for performing computations on data at an intelligent data pipe en route to a data store. In one embodiment, a method is disclosed, comprising: receiving metadata regarding a data stream from a data source; performing an analysis of the metadata at a service orchestrator; creating at least one container instance based on the analysis; streaming the data stream from the data source to a data sink via the at least one container; and processing the data stream as it passes through the at least one container instance, thereby enabling application-aware processing of data streams in real time prior to arrival at the data store.

20 Claims, 12 Drawing Sheets

(56) References Cited

U.S. PATENT DOCUMENTS

| | | | |
|---|---|---|---|
| 9,965,330 B2* | 5/2018 | Bishop | G06F 3/067 |
| 10,216,490 B2* | 2/2019 | Eksten | G06F 8/20 |
| 10,310,824 B2* | 6/2019 | Eksten | G06F 9/44521 |
| 10,606,711 B2* | 3/2020 | Bishop | G06F 11/1471 |
| 2013/0016657 A1 | 1/2013 | Muhanna et al. | |
| 2013/0040683 A1 | 2/2013 | Siomina et al. | |
| 2013/0159395 A1 | 6/2013 | Backholm et al. | |
| 2013/0185439 A1 | 7/2013 | Velasco | |
| 2013/0198180 A1 | 8/2013 | Channing | |
| 2013/0282227 A1 | 10/2013 | Chen et al. | |
| 2013/0346558 A1 | 12/2013 | Khalidi et al. | |
| 2016/0077925 A1* | 3/2016 | Tekade | G06F 16/2365 707/654 |
| 2017/0075693 A1 | 3/2017 | Bishop et al. | |
| 2017/0279770 A1 | 9/2017 | Woolward | |
| 2018/0203744 A1* | 7/2018 | Wiesmaier | G06F 9/4881 |
| 2018/0285250 A1 | 10/2018 | Helsley | |
| 2019/0149425 A1 | 5/2019 | Larish et al. | |

OTHER PUBLICATIONS

"Big Data Analytics", Ericsson White Paper, Uen 288 23-3211, Rev B, Telefonaktiebolaget LM Ericsson, Oct. 2015.

David Neumann, Thomas Wiese, Wolfgang Utschick, "Learning the MMSE Channel Estimator", eprint arXiv:1707.05674v3, Feb. 6, 2018.

M. Sanchez-Fernandez, M. De-Prado-Cumplido, J. Arenas-Garcia, F. Perez-Cruz, "SVM Multiregression for Nonlinear Channel Estimation in Multiple-Input Multiple-Output Systems", IEEE Transactions on Signal Processing, vol. 52, Issue: 8, Aug. 2004.

* cited by examiner

DATA PIPELINE FOR SCALABLE ANALYTICS AND MANAGEMENT

CROSS-REFERENCE TO RELATED APPLICATIONS

This application claims priority under 35 U.S.C. § 119(e) to U.S. Provisional Pat. App. No. 62/628,229, filed Feb. 8, 2018, and U.S. Provisional Pat. App. No. 62/739,638, filed Oct. 1, 2018, both titled "Data Pipeline for Scalable Analytics and Management," each of which is also hereby incorporated by reference in its entirety for all purposes.

This application also hereby incorporates by reference, for all purposes, each of the following U.S. patent application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety. The purposes for the above incorporations by reference include at least to provide detailed information about the features and functionality of the Parallel Wireless CWS (RAN) and HNG (coordinator) products.

BACKGROUND

The availability of high-capacity networks, low-cost computers and storage devices as well as the widespread adoption of hardware virtualization, service-oriented architecture, and autonomic and utility computing has led to growth in cloud computing. Virtualization has been further advanced by the determination that some processes do not require virtualization of the underlying hardware.

A new class of virtualization tools, known as containers, has taken root in recent years. Containerization, also known as operating-system-level virtualization, refers to an operating system feature in which the kernel allows the existence of multiple isolated user-space instances. Such instances, called containers, partitions, or virtual environments (VEs), may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container.

Containers are the fast-growing class of tools, growing at an annual clip of 40%. This will be one of the most widely adopted cloud tools, surpassing OpenStack, PaaS, and other offerings (source: 451 Research) projects growth in application containers for enterprise and SP markets from $762 million in 2016 to $2.7 billion by 2020. Worldwide Container as a Service (CaaS) Market to grow at a CAGR of 34.8% during the forecast period 2017-2023 to aggregate $4,208.1 million by 2023. According to Infoholic Research, implementation of CaaS is becoming ubiquitous and nearly 70% of users are expected to adopt or evaluate the technology in the next 5-10 years. The orchestration application market is predicted to grow and reach $1,178.3 million by 2023 from $264.2 million in 2017 with CAGR of 28.3%.

Turning to the needs of telecommunications network operators, with 5G on the horizon, cellular network load will consist of people and IoT traffic generating massive volumes of data and requiring real-time network orchestration, that would benefit from the application of containerization to the internal processes of these operators.

SUMMARY OF THE INVENTION

The invention relates generally to stream data processing, and in particular, to an architecture utilizing an intelligent data pipeline for scalable analytics and management.

In a first embodiment, a method is disclosed for performing computations on data at an intelligent data pipe en route to a data store, comprising: receiving metadata regarding a data stream from a data source; performing an analysis of the metadata at a service orchestrator; creating at least one container instance based on the analysis; streaming the data stream from the data source to a data sink via the at least one container; and processing the data stream as it passes through the at least one container instance, thereby enabling application-aware processing of data streams in real time prior to arrival at the data store.

The method may further comprise coordinating the at least one container instance using Kubernetes or Docker Swarm. The method may further comprise making a copy of the data stream en route from the data source to the data sink. The method may further comprise creating multiple container instances for processing the data stream. Processing the data stream may further comprise enriching the data stream or transforming the data stream.

The method may further comprise creating container instances for data copying and for aggregate data processing. The method may further comprise deactivating the at least one container instance upon inactivity of the data stream.

The method may further comprise selecting an appropriate data type of the data sink based on the metadata. The method may further comprise creating multiple container instances to split the data stream into multiple data streams and to perform processing in parallel of the split data stream, or to copy the data stream into multiple data streams and to perform separate processing of each of the multiple data streams. The method may further comprise enabling data replication and aggregate analytics data processing in parallel using multiple processing streams of the data stream. The method may further comprise making changes during processing to storage, compute, or networking needs of the at least one container instance based on the metadata. The method may further comprise composing an analytics data view in the pipeline in near-real time based on data records in the data stream.

Processing the data stream may further comprise reformatting the data stream into another data format. The method may further comprise receiving the data stream via highly available queues. The method may further comprise performing pattern recognition of the data stream at the at least one container instance. The method may further comprise enabling snapshots, clones, QoS, compression, encryption, data tiering, replication, high performance, app snapshot, app clone, app deploy, scaling, backup, upgrade, or multi-tenancy at the at least one container instance.

The metadata may further comprise a data stream source, a data stream sink, and a data type. The metadata may indicate that the data stream has a data type that may be one of: flat file, Excel, CSV/JSON, Hive, JDBC data sources, Oracle, Microsoft, MySQL, IBM DB2, IBM Netezza, HP Vertica, SAP HANA, Teradata, Amazon AWS Redshift, Google BigQuery, Kafka streaming and cloud applications web services. The method may further comprise enriching the data stream with supplemental data from a second data stream, the supplemental data being human-readable data for interpreting the first data stream and the first data source.

In a second embodiment, a non-transitory computer-readable medium is disclosed, containing instructions which, when executed, cause a data storage system to perform steps comprising: receiving metadata regarding a data stream from a data source; performing an analysis of the metadata at a service orchestrator; creating at least one container instance based on the analysis; streaming the data stream from the data source to a data sink via the at least one container; and processing the data stream as it passes through the at least one container instance, thereby enabling application-aware processing of data streams in real time prior to arrival at the data storage system.

In a third embodiment, a system is disclosed for performing computations on data en route to a data lake, comprising: a data pipe management module configured to: read data stream flow definitions; manage activation of containers based on the data stream flow definitions; and manage source and sink configurations of the containers based on the data stream flow definitions; and a cloud processing platform configured to: create a first container for copying a data stream from a source to a sink based on commands from the data pipe management module; create a second container for data ingestion based on load requirements; and create a third container for performing dynamic data processing on data in the data stream while the data stream may be being copied.

The method may further comprise the data lake, the data lake being configured to provide temporal storage, secure customer data storage, and aggregate storage.

The cloud processing platform may be configured to perform aggregate data computation and computation of statistics on the data stream. The cloud processing platform may be configured to split a single data stream into multiple data streams. The cloud processing platform may be configured to provision data feeds from external sources including customer databases. The cloud processing platform may be configured to inject in-line processing in a data pipe. The data pipe management module may be configured to provide administration and auditability of containers and of data streams. The data pipe management module may be configured to provision additional containers based on desired performance characteristics.

The second container may be configured to provide fault detection and notification of data ingest flows. The cloud processing platform may further comprise an adapter for converting an input format of a source data stream. The cloud processing platform may further comprise a data stream metadata analyzer.

In a fourth embodiment, a method is disclosed for allocating resources in a data pipeline, comprising: analyzing metadata regarding a first data stream from a first data source, the metadata The method may further comprise an originated data record format of the first data stream, and an intended use case of the first data stream; selecting an appropriate type of data sink based on the metadata; and allocating at least one container instance based on the selected type of data sink.

The originated data record format may be at least one of: key-value pair; parquet; indexed data; textual data; arbitrary data; and schema-structured data. The intended use case may be at least one of: real-time network performance analytics to a mobile operator; near-line storage for providing enrichment of additional data; offline analytics processing; machine learning input data; machine learning model data; long-term storage; and billing. The metadata may be derived from static configuration, derived from metadata of the first data stream, or automatically derived by a pattern recognition system. The allocated at least one container instance may be chosen for performance characteristics based on the intended use case. The method may further comprise selecting at least one additional data sink based on the metadata. The method may further comprise composing an analytics data view in the pipeline in near-real time based on data records in the data stream.

In a fifth embodiment, a method is disclosed, the method comprising: receiving source data from at least one data source at a Hetnet Data Analytics (HDA) data lake by way of an intelligent data pipe disposed between the source data and the data lake, the intelligent data pipe permitting source data to be presented from the at least one data source to the HDA data lake in real time; processing the source data within the HDA data lake; and providing user access to information based on the processed source data, the information available to a user by at least one of an operational dashboard, a report and analytics portal, an analytic workspace, services and external systems, a Self Organizing Network (SON), and a HetNet Gateway (HNG).

The intelligent data pipe may further comprise a set of processes defined on-demand and using at least one container for bringing in data streams for processing, and for collecting counters, data sets, transactions flowing from devices, databases or streams. The intelligent data pipe may further comprise services, topics and storage. Using at least one container may further comprise using at least one container preconfigured with client access tools for the data lake and having analytics libraries installed. The services may be attached in-line to the topics to recognize patterns generating alert or write data to destinations. Topics comprise highly available queues for data to be written in, from external sources or the data lake. The attached in-line services have an ability for pattern recognition or writing data. The receiving source data may further comprise receiving data from at least one of a HetNet Gateway, customer data, and external data. The processing the source data within the HDA data lake may include using a plurality of data stores within the HDA data lake. Using a plurality of data stores within the HDA data lake may include using at least one of: a temporal database; a customer data database; a management database, an aggregates and Key Performance Indicators (KPIs) database, and a management database. Processing the source data within the HDA data lake may include distributing processed and analytic models for actionable events.

In a sixth embodiment, a method is disclosed, the system for providing data analytics comprising: at least one data source providing source data; a HetNet Data Analytics (HDA) data lake in communication with the at least one data source by way of an intelligent data pipe disposed between the source data and the data lake, the intelligent data pipe permitting source data to be presented from the at least one data source to the HDA data lake in real time, the HDA data lake providing processing of source data and producing information; and a data services interface in communication with the HDA data lake, the data services interface providing user access to the HDA data lake information.

The intelligent data pipe may further comprise a set of processes defined on-demand and using at least one container for bringing in data streams for processing, and for collecting counters, data sets, transactions flowing from devices, databases or streams. The intelligent data pipe may further comprise services, topics and storage. Using at least one container may further comprise using at least one container preconfigured with client access tools for the data lake and having analytics libraries installed. The services may be attached in-line to the topics to recognize patterns generating alert or write data to destinations. Topics comprise highly available queues for data to be written in, from external sources or the data lake. The attached in-line services have an ability for pattern recognition or writing data. The source data may be received from at least one of a HetNet Gateway, customer data, and external data. The processing the source data within the HDA data lake may include using a plurality of data stores within the HDA data lake. Using a plurality of data stores within the HDA data lake may include at least one of: a temporal database; a customer data database; a management database, an aggregates and Key Performance Indicators (KPIs) database, and a management database. Processing the source data within the HDA data lake may include distributing processed and analytic models for actionable events.

In a seventh embodiment, a non-transitory computer readable storage medium is disclosed having computer readable code thereon for providing data analytics, the medium including instructions executable by one or more processors to perform operations, comprising: receiving source data from at least one data source at a Hetnet Data Analytics (HDA) data lake by way of an intelligent data pipe disposed between the source data and the data lake, the intelligent data pipe permitting source data to be presented from the at least one data source to the HDA data lake in real time; processing the source data within the HDA data lake; and providing user access to information based on the processed source data, the information available to a user by at least one of an operational dashboard, a report and analytics portal, an analytic workspace, services and external systems, a Self Organizing Network (SON), and a HetNet Gateway (HNG). The non-transitory computer readable storage medium may further comprise instructions for the intelligent data pipe such that it may further comprise a set of processes defined on-demand and using at least one container for bringing in data streams for processing, and for collecting counters, data sets, transactions flowing from devices, databases or streams.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Figure 1:
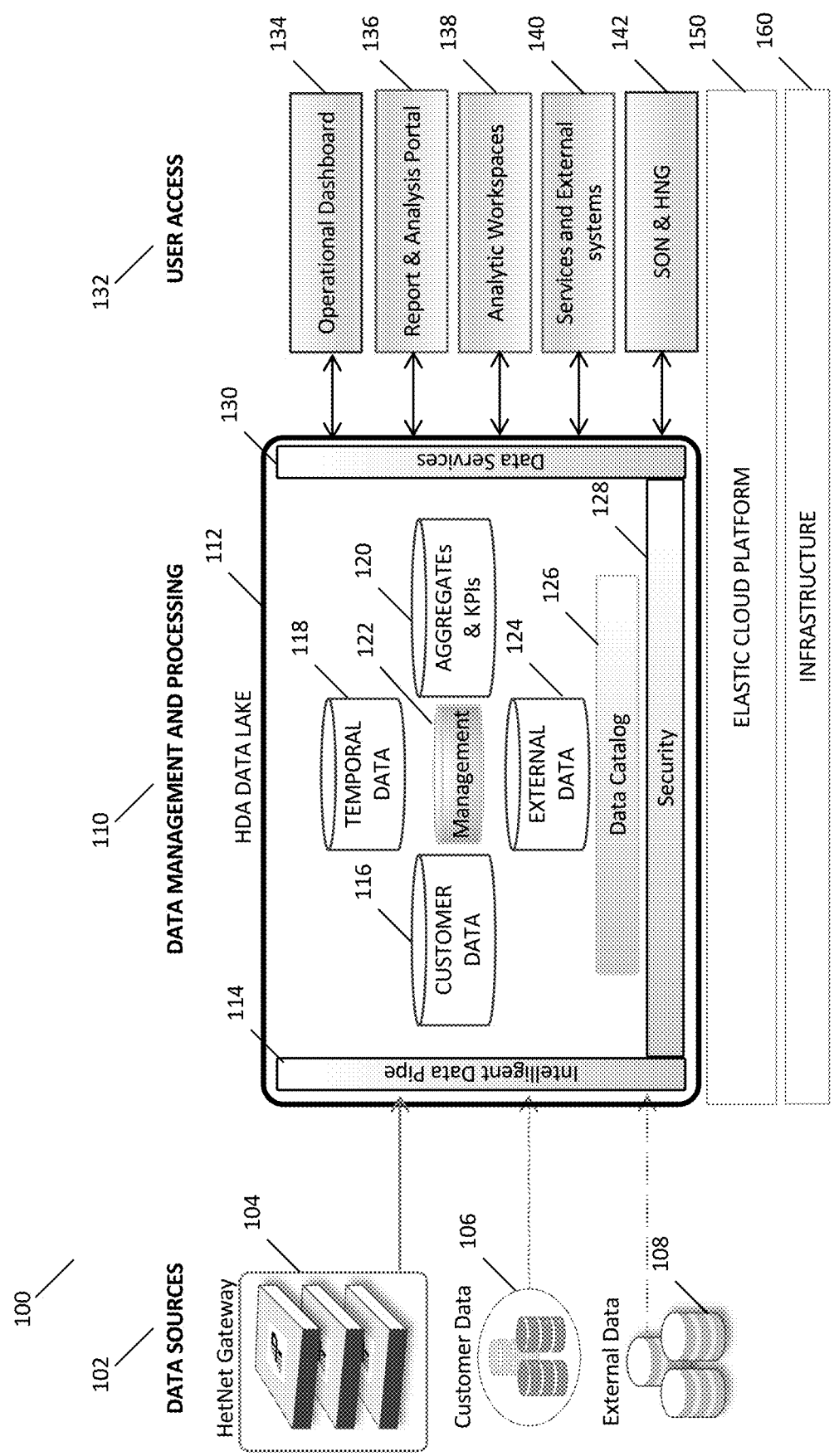
FIG. 1 depicts a diagram of a HetNet Data Analytics (HDA) solution architecture, in accordance with some embodiments.

The problem statement for network operators is as follows. Current network operator management data stores (OSS/BSS) have significant issues: Data warehouses are built to gather and collect statistics for network operation. However, current data warehouses constitute a missed opportunity to provide user centric views of the network, e.g., who is connected to the cell tower right now and what they are doing? Rigid data structures of OSS/BSS make it difficult to provision new data sources such as user activity in real time Lack of scalability—most of these data stores keep only temporal data for a short time Resources and time are spent unnecessarily by operators to get holistic view of network consumption, and often the resulting inaccuracies are a big challenge Each generation of radio being different, it is painful to combine the data to create a holistic view for the operators to see network consumption across multiple RATs/G's.

A new innovative platform is disclosed herein with the following goals: eliminate the information gathering and collection difficulties from radio networks; enable easy access to data without temporal boundaries (real time vs batch), stored inexpensively; provide a security framework controlling access to the stored data sets; provide a user-friendly catalog to search thru the large number of data sets; enable analysis of data in real time for Radio Network; enable a self-provisioned and configured platform to generate and execute data pipeline based on customer driven-SLAs; enable auto sizing of compute and data stores, thereby enabling the ability to scale with demand with smart analytics; hide platform complexity from the analyst with auto configuration.

This system can be used to dramatically improve operational efficiency at reduced cost, e.g., monitor coverage interference, gaps, collisions, throughput, power level, network capacity understand temporal network usage patterns, traffic, weather optimize service quality within area of operation optimize spectrum use, real-time bandwidth & load characteristics monitor noise levels, dropped calls, handovers; operate adjust power levels for self-organizing network; understand failure of equipment, power outages.

Active monitoring of RAN control parameters can include, for example: real-time monitoring of counters and stats; identification of coverage interference, gaps, collisions; measurement of noise levels, dropped calls, handovers; collision detection within area of operation; realtime detection of network counters, data, power, capacity; macro patterns in network usage prediction; periodic network usage patterns (temporal traffic patterns: rush hours, holiday travel, special events); usage patterns due to weather related events, catastrophic events; equipment or power outages planned or unplanned. Service optimizations can include, for example: near-real time load balancing between towers and nodes from overloaded to underloaded; optimal use of spectrum, bandwidth based on real-time load characteristics; intelligent power-level control for self-organizing networks; collision detection and reduction within identifiable area of operation; optimization of service quality within area of operation; reduction of coverage interference from mobile networks.

In addition, network operations management is also enabled, such as: real-time network monitoring and hotspot detection; network monitoring and detection of service failures; measurement of SLAs and KPIs as established in contracts; alerts and notification generation; proactive monitoring; prediction of network problems that may contribute to the QoE and SLA; prediction of temporal network consumption and configurations; service call processing; service call generation and availability of diagnostic data for field technician; measurement of service call resolution; executive management reports; managed service business and financial measurements; customer contract and SLA servicing; reports and dashboard for customers to review service operation; and custom real-time network counters and stats dashboards.

A software-defined cloud platform is disclosed herein that provides compute, storage and network to the services that are responsible for data life-cycle management and App execution. Examples of data management services are: 1. Pipeline processing: jobs that are responsible for ingesting external data into the data lake from gateways; 2. Storage services: software platform provide data persistence, hadoop, cassandra, kafla, etc.; 3. Catalog services: meta-data for data sets cataloged to search and correlate data sets, tag, schema, sourcing etc.; and 4. Security services: administer and govern dataset access.

Data analytics can be utilized to provide for improved operational efficiency of a network. The data analytics can be used by a network performance analyst to analyze network operational characteristics from real time and historical counters. The data analytics can also be used by a network performance manager to generate personalized dashboards, reports and models to optimally administer a network. Executive management can use the data analytics to generate dashboard and analytic reports to make business decisions. Business analysts can utilize the data analytics to provide dashboards and Key Performance Indicators (PIs) for financial and operational measurements. Data scientists use the analytics data to develop models using statistics, quantitative algorithms, Artificial Intelligence, (AI), Machine Learning (ML) and the like.

The analytics framework for HDA requires the gathering of data. This may include the collection of raw data such as network counters, configurations, mobile network files, operator Business Support System (BSS) and Operator Support System (OSS) data, and public data sources. This data is cataloged, stored and made securely accessible in a timely manner.

The analytics framework for HDA requires analysis of the gathered data. Qualitative and quantitative techniques are applied on the data to derive patterns, categorization and operational characteristics from the data. The analysis may also result in the development of statistical classification, regression, ML, AI and KPI reports.

The analytics framework for HDA further requires performing operations on the analyzed data. This may include publication of analysis reports results/KPIs in dashboards and reports for operations. Analytic models may be embedded in applications and controls for close-loop and open-loop decision making.

The Radio Area Network (RAN) can benefit by using this data for operational efficiency using intelligent applications derived from analytical models. In some instances, this may include active monitoring of RAN control parameters. This active monitoring includes: real-time monitoring of counters and stats including identification of coverage interference, gaps, and collisions; measurement of noise levels, dropped calls, and handovers; collision detection within area of operation; and real time detection of network counters, data, power, and capacity.

The intelligent applications may further be used to identify macro patterns in network usage prediction. This may include periodic network usage patterns (temporal traffic patterns: rush hours, holiday travel, special events); usage patterns due to weather related events, and/or catastrophic events; and equipment or power outages planned or unplanned.

The intelligent applications may also provide service optimizations. The service optimizations include near-real time load balancing between towers and nodes from overloaded to underloaded; optimal use of spectrum, bandwidth based on real-time load characteristics; intelligent power-level control for Self-Organizing Networks (SONs); collision detection and reduction within identifiable area of operation; optimization of service quality within an area of operation; and reduction of coverage interference from mobile networks.

The present framework can also provide managed service offerings supported by rich analytics. This includes managing the network on behalf of customers. Network operations management can provide real-time network monitoring and hotspot detection. Network operations management may further provide network monitoring and detection of service failures, as well as measurement of Service Level Agreements (SLAs) and Key Performance Indicators (KPIs) as established in contracts. Network operations may further provide alerts and notification generation, proactive monitoring, prediction of network problems that may contribute to the Quality of Experience (QoE) and SLA, prediction of temporal network consumption and configurations, service call processing, service call generation and availability of diagnostic data for field technicians, measurement of service call resolution, executive management reports, and managed service business and financial measurements.

The framework may further provide customer contracts servicing including customer contract and SLA servicing which may include as providing reports and dashboard for customers to review service operation and custom real-time network counters and stats dashboard.

An Intelligent Pipeline API is disclosed that supports Ingest patterns (1) Batch, (2) Micro-batch and (3) Data streams to get data from source systems Ingest brings data into the data lake from various sources. The sources can be automated processes, systems, sensors, equipment or human users. Patterns in ingest processes are batch, micro-batch and real-time. Depending on the type of source data the ingest process designed to bring in the source data into the platform. The sources can be automated processes, systems, sensors, equipment or human users.•Data pipeline is an architectural concept typically used to describe a mechanism to bring in data into data lakes. It is often referred to as "data ingestion". Typically, data pipelines is represented with a series of loosely coupled process steps that are pre-determined by developer, executed in sequence or parallel to facilitate the data gathering and target writing. Elaborately, some pipeline process steps can represent data extraction, date transformation, data enrichment, data sorting, data classification and storing. The designers of data pipeline determine process steps required for the data processing.

More advanced pipelines embed pattern matching, machine learning, classification, clustering algorithms to detect events and anomalies happening during data ingestion process. As a result, pro-active actions can be either indicated or taken during the data ingest process within pipeline. Since pipeline process is a loosely coupled process sets, these advanced algorithms can be added, updated or removed from the pipeline as desired by the designer to change the processing outcome.

Source systems changing continuously can provide changed data in a real-time or a near-real time basis. Cloud applications prefer to generate change data real-time in from of streams for the down-stream apps can take action or report the changes at a near-real time basis. In this pattern of data distribution, source systems post change data to a stream processor in a continuous basis. The receiving system polls stream continually to receive any postings. Pub-sub is a typical model used to process data streams; the source system publish changes to message queues/topics subscribed by a host of consumers interested in receiving the information. The change data from source is either pushed or pulled by an external entity into queues or topics. Each consumer potentially process data differently to meet their use cases.

Data streams are fundamental pattern use in distributed data processing to rapidly propagate impacts of change data in multiple disjointed business processes close to near real-time basis. Considerations: Used for rapidly changing data sets such as, bookings, reservations, connection established etc.; Ingest process provide listeners running continuously to capture the change data from streams; Storing data streams in raw format. Challenges: Always available listeners to prevent loss of data; Streams data values decrease with time. Process data as soon as it is received; Data and Analytics platform provides a framework to build intelligent data pipelines to capture data from the source systems.

Fundamentals of Data lake begins with the assumption that it contains raw data that can be transformed later as needed by the analytics process in a desired way trying to do answer a question with evidence. Simply speaking the data lakes follow the model LT pattern with Load (L) the data first as raw and Transform (T) many times ad needed by the analytics. Modern analytics thrives on raw data. The core data lake platform provides ability to quickly load incoming data, store cost effectively as possible, and an embedded compute platform to transform data for the analytic model close to the storage bringing the efficiencies in large scale data processing.

Philosophically, data lake differs from the conventional data analytics where the SQL databases contains predefined tables that can store the incoming data with relationships. As soon as a data is stored in structure with relationships, the scope of analytics becomes pre-determined. Any attempt to expand the scope analytics results in expensive transformation and/or missing data granularity. Traditional data warehouses practice requires purpose build data marts to retransform data from the data warehouse to data structures to a normalized format for the purpose of specific analytics. These transformation and retransformation of data between data warehouse and data marts are time consuming, expensive to build and maintain, lacking time to make analytics available for decision making. Relational databases used for data warehouse supports a vertical stack architecture which limits availability of the compute resources. As the data or compute demand grows, organization of data and storage have to be readjusted to accommodate for the load. The Data lakes are built on distributed compute architecture and commodity servers with an intent to scale storage and compute independent of data and analytics growth. Adding servers to the data lake cluster automatically expand both the storage and compute capacity of the data lake without readjustment of the data.

Modern data lake platforms support different styles of data stores to store data, including: Columnar; Relational; MPP databases; Text index; Log files; KV stores; XML; Graph databases; Cache; Object stores. Some data lake platforms support in-memory databases for both data ingest and query processing minimizing latency for real-time analytics. Traditional data warehouse or marts mandates first write data to disk/table before processing.

Data catalog service is an essential service designed to catalog data set entries known to the data lake. The catalog service has a repository to store known data set schema objects during a registration process. Schemas can be auto-determined from the data, as the data lake and intelligent pipeline are able to handle heterogeneous schemas when processing data, using the lightweight processes described herein. This ensures minimal time spent normalizing data across schemas and allows the data itself to dictate the appropriate schema and treatment, like the data is determining its own SLA. Catalog registry provides CRUD interfaces to insert, update, delete and search catalog entries. It is mandatory that every data set stored in the data lake should have a corresponding catalog entry. As an internal service the data catalog repository and corresponding services are included in the base package.

HDA uses deep analytics identifying network usage patterns. The network usage patterns include traffic, retainability, access, availability, and faults. The HAD also includes understanding temporal patterns in network and spectrum, proactive fault determination and intelligent healing of network, and improve network equipment utilization.

HDA can be used to improve subscriber Quality of Experience (QoE), provide data driven actionable intelligence, ands a smart HNG. The HDA may further provide self-service visualization including personalized dashboards: OSS/BSS, user defined views, charts. The HDA also provide ML and AI fault detection and usage analytics with alerts and notifications. The HDA uses smart data pipes and data management to gather raw data network equipment and core operation thru configuration as well as real-time stream analytics, pattern identification and alert generation. The HDA is a scalable platform featuring elastic compute, storage and data processing as well as high-availability with fault tolerance.

The operational efficiency of a network relies on on-line and off-line analytics. Users of the data analytics include network performance analysts who analyze network operational characteristics from real time and historical counters. Users of the data analytics also include network performance managers who utilize personalized dashboards, reports and models to optimally administer network. Executive management persons use dashboards and analytic reports to make business decisions. Business analysts and performance management personnel use the data analytics to create dashboards and KPIs for financial and operational measurements. Data scientists and performance management personnel develop models using statistics, quantitative algorithms AI, machine learning, etc.

The analytics framework for HDA gathers data, analyzes the data and publishes the results. The gathering of data includes the collection of raw data network counters, configurations, mobile network files operator BSS and OSS data and public data sources. The collected data is catalogues, stored and made securely accessible in a timely manner. The data analytics utilizes qualitative and quantitative techniques applied on the data to derive patterns and to categorize and determine operational characteristics from the data. The published results include analysis results and KPIs in dashboards and reports for operations. Also published as analytic models imbedded in applications and controls for close-loop and open-loop decision making.

The HDA solution architecture 100 is shown in FIG. 1. The architecture 100 includes data sources 102. The data sources 102 in one embodiment include a HetNet Gateway 104, customer data 106 and external data 108. The HetNet Gateway 104 is a RAN management and virtualization node, described elsewhere herein and in the documents incorporated by reference into this document. The solution architecture 100 also includes a data management and processing element 110 in communication with the data sources 102. The data management and processing element 110 includes an HDA data lake 112. The HDA data lake includes an intelligent data pipe 114 providing an interface to the data sources, as well as various data stores: a customer data store 116, a temporal data store 118, an aggregate and KPI store 120, and an external data store 124. A management element 122 is present to manage interconnections between the various data stores. The HDA data lake 112 also includes a data catalog 126, a security element 128 for ensuring secure communications for all data stores based on per-data store policies, and data services element 130 for interfacing with external user systems. The HDA solution architecture includes a user access element 132 for providing external user services (see FIG. 4). The user access element 132 includes, as examples, an operational dashboard 134, a report and analysis portal 136, analytic workspaces 138, services and external systems 140 and SON and HNG 142. The HDA architecture 100 further includes an elastic cloud platform 150, for providing extensible, virtualized infrastructure on a public or private cloud, and infrastructure hardware 160, e.g., physical servers and networks.

Several different data types are stored in the HDA. One type of data stored in the HDA is HNG/CWS Counters. The HNG collects 2G, 3G, 4G (LTE), 5G, etc. counters from a directly-connected CWS or from relayed CWS or relayed base station; generates its own counters and collects HW usage stats. Some examples are setup success rate for RRC, ERAB and calls, call drop, handovers, throughputs, network latency, RSSI, signal strength, utilization, coverage, capacity, etc. Also stored are UE counters for UE measurements. Also stored are neighbor lists. Also stored are UE measurement reports.

Another type of data that may be stored in the HDA is customer data sets. Operators run core systems to manage contracts, billing and policy etc. Data sets from the core system can be added to the network data to further analyze customer and network. Examples of this type of data include HSS, billing, MSS, contracts, lawful intercept, etc. Also included are credentials for connecting to these types of legacy systems, for read or read-write access.

Another type of data that may be stored in the HDA are external data streams or sets. This data may include demographics, traffic patterns, weather, terrain information, $3^{rd}$ party purchased data, social media data can enrich and provide a better view.

Another type of data that may be stored in the HDA are operator-configured user-friendly labels. The data that comes through the HDA is typically labeled or tagged with its source, but the source of certain data may not be human-readable. For example, the hardware RAN ID of a specific base station may identify the source or provenance of a particular statistic, but the hardware RAN ID is not as helpful to the network operator as a text label, for example, "Northeast Region 2 Cell 5." Similar labels and user-friendly text parameters may be stored and may be combined with data that passes through the pipeline when creating real-time analytics, as explained further below.

Data lake should maintain an exact copy of the raw data before any transformation takes place. In design of pipeline process, care should be taken to store a copy of the incoming data. Designers may choose to use an efficient file format for the storage optimization without changing the contents of the data. For example, data sets received as CSV files can be stored in Parquet compressed file system, but the timestamp present in the incoming data should not be modified from linux to UTC for the raw storage. In another example, verbose device logs captured in the data lake should be appended to the raw log files as is without changes or feature extraction.

The raw data sets should have a TTL (time-to-live) policy associated so that growth of the Data Lake storage does not grow out of bounds. Ability to use raw data in future to build additional analytics Pipelines generating process data can be recovered in case of failure by replaying data from the raw file Data lake storage size will be relatively large to accommodate raw data accumulated from all the source systems. Base implementation of data lake supports types of HW storage (SSD, SATA, SCSI, etc.). Depending on value of the data, a cost-based storage solution can be provided. For example: use cheaper SATA disks for raw data, while SSD to provide cache persistence for streaming services.

In some embodiments, a lightweight agent running in HNG 104 watches availability of new data and notifies the pipeline 114. A data pull process is initiated, get data from HNGs Each HNG instance has one of the lightweight agents installed and running. Data types at the HNG could include: counters and stats collected at HNG; CWS locations, configuration parameters—Stats related to HW etc.; alarms and alerts; logs (HNG and CWS); configuration changes; backhaul measurements.

Figure 2:
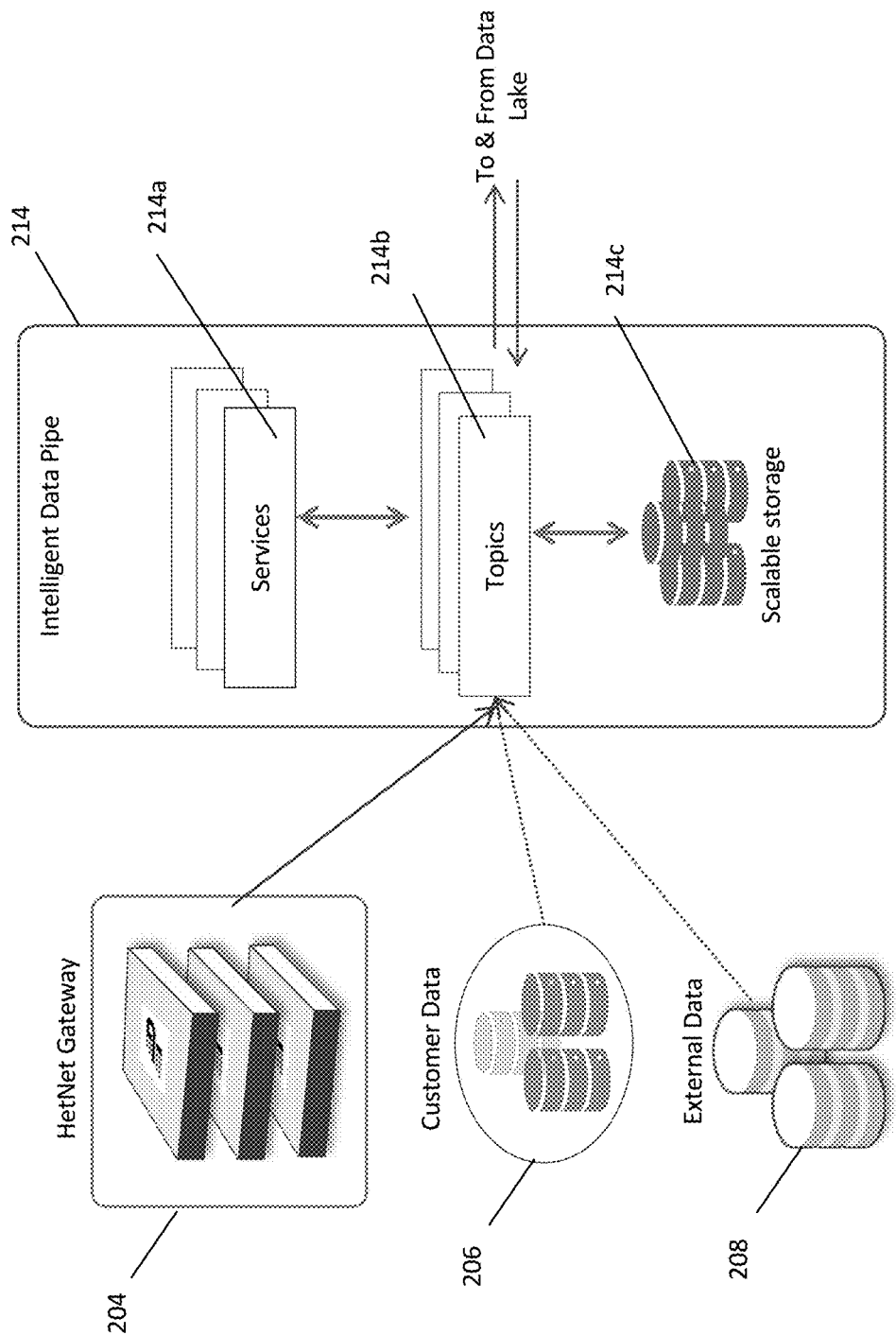
FIG. 2 depicts a diagram of an intelligent data pipe, in accordance with some embodiments.

Referring now to FIG. 2, the intelligent data pipe 214 is shown. The intelligent data pipe 214 is in communication with the HetNet Gateway 204, customer data 206 and external data 208. The intelligent data pipe 214 includes services 214a and topics 214b and provides and receives data from the remainder of the data lake. The intelligent data pipe also includes scalable storage 214c.

The intelligent data pipe 214 is an orchestrated set of processes defined on-demand to bring in data streams to HDA for processing, provisioned to collect counters, data sets, transactions flowing externally from devices, databases or streams. The intelligent data pipe 214 provides several different types of functionality. These include the ability to stream data from source to the sink; the ability to configure as a service on-demand from UI or CLI; the ability to support multiple data formats, such as JSON, CSV, XML; and the ability to attach light-weight dynamic data processing services.

The topics 214b of the intelligent data pipe 214 comprise highly available queues for data to be written in, from external sources or data lake. The attached in-line services 214a may have ability for pattern recognition or writing data. The storage 214c is a fault tolerant temporal storage attached to topics that caches data. The services 214a comprise micro-services attached in-line to the topics to recognize patterns generating alerts or write data to the destinations.

Figure 3:
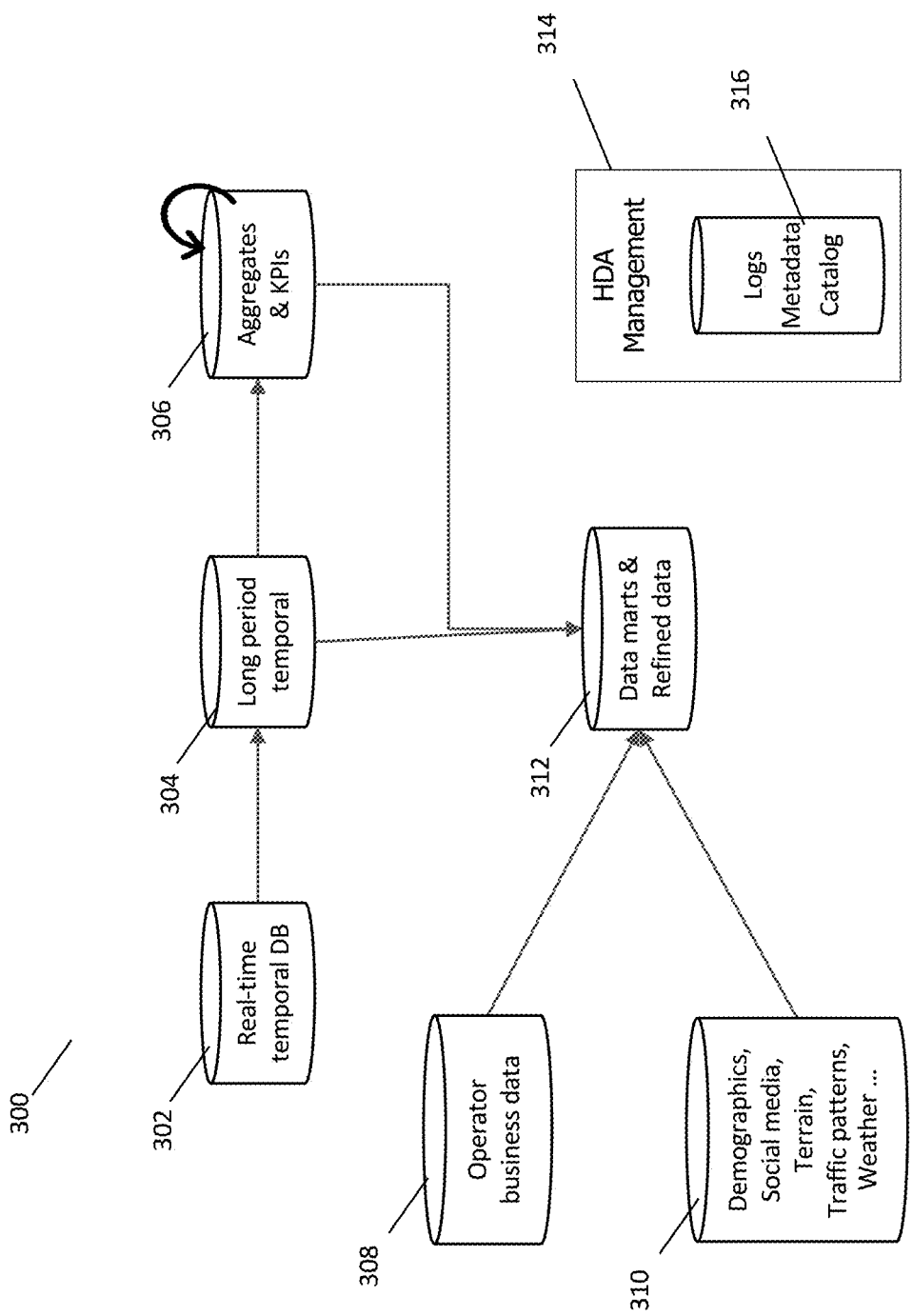
FIG. 3 depicts a diagram of the data stores in the HDA architecture, in accordance with some embodiments.

Referring now to FIG. 3, an HDA data store 300 is shown. The HDA data store 300 includes a real-time temporal database 302 which is used for operational dashboard. The real-time temporal database 302 is in communication with a long period temporal database 304. The long term temporal database 304 provides long term storage (e.g. two years or more) for counters, UE aggregates and derived data sets. The HDA data store 300 also includes an aggregates and KPIs database 306. This database 306 is in communication with the long period temporal database 304, and is used for statistical processes, classification, regression and aggregation of data.

Also shown is an operator business data database 308, used for storing operator specific internal data ingested into the HDA data lake. A demographics, social media, terrain, traffic patterns and weather database 310 may be included in the HDA and is used to store data from public data sources ingested into the HDA for building models. A data marts and refined data database 312 is used to store ML, AI or statistical models generating refined data sets for use. Database 312 is in communication with database 304, 306, 308 and 310.

The HDA management data store 314 includes a logs, metadata and catalog database 316. The database 316 store HDA management data including security data, metadata, auditable access logs and a data catalog.

The HDA store provides information persistence, information management services and information distribution services. The information persistence service ensures incoming or derived data sets are stored in most efficient format based on intended usage pattern. For example, a real-time data set used in operational dashboard is stored in a time-series database to optimize the ingest rate while facilitating the time-series windowing techniques for aggregation and analytics.

The information management service comprises a set of build-in management services ensuring data sets are securely accessed by the users or systems with audit trails. Data analysts can use the catalog feature to find datasets that can be used to build analytical models or analytics.

The information distribution service includes data sets stored in HDA that are made available for use by authorized users using data services. The data services range from direct JDBC/ODBC access to complex rest service protocols. A set of management services enables definition, configuration and deployment of secure data access.

The functional requirements of the data stores in the HDA include one or more of the following: ability to store time-series data sets for real-time and longer period aggregation and analytics; ability to ingest public or 3rd party aggregated data sets; ability to archive or migrate data from data stores based on time schedule or request; ability to store datasets in multiple formats such as: relational, columnar, text data; ability to capture and store metadata for ingested datasets; ability to generate user searchable catalog; ability to configure a logical data landing location associated security parameters; ability to encrypt data at rest; and ability to wrap secure Rest service to access datasets.

Analytic developers and consumers include network operators, business analysts, data scientists and external applications or servers. Network operators use real-time data and analytics dashboard tools to create personalized parameter measurements and thresholds for network monitoring and control. Network operators also report PIs and KPIs to management and use visual tools to build the dashboard and/or reports.

Business analysts use ad-hoc data analysis exploring historical trends, patterns, performance indicators, what-if analysis etc. The business analysts also use summarized historical data available from data marts and use desktop Business Intelligence tools or Excel performing analysis.

Data scientists build analytical models for ML, DL, Classification, Regression etc. Data usage depends upon the question to be answered. Prefer to use raw data for the models.

The data scientists also use statistical libraries written in Python, R etc. Programmers like to directly use the system.

The external applications or servers perform Apps or Micro services query or download processed or refined data for closed loop or open loop processes or configurations or personalizing UE experience, etc. Additionally, the operationalization of analytics is used.

Figure 4:
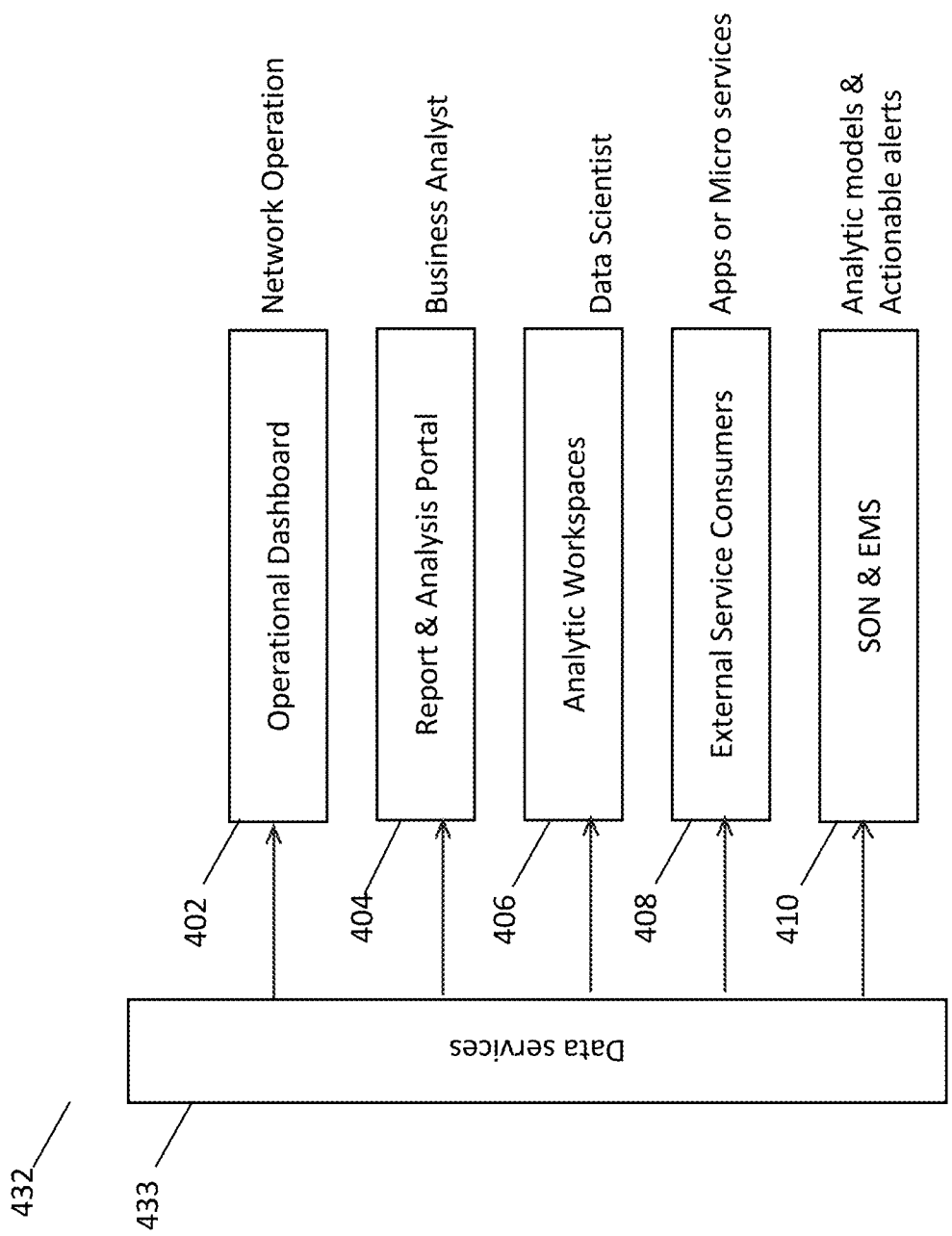
FIG. 4 depicts a diagram of an HDA data analytics distribution, in accordance with some embodiments.

Referring to FIG. 4, HDA data and analytics distribution utilizes a framework 432 to distribute processed and analytic models for actionable events, as shown. Data services 433 provides data access by way of an operational dashboard 402, a report and analysis portal 404, analytic workspaces 406, external service consumers 408, and SON and EMS 410.

The data lake enables secure access to the stored and processed data based on user intent and preferred set of tools. The following functionality is provided: ability to support secure protocol connection with dashboards; ability to connect with BI or Excel tools using standard adaptors; ability to provide a workspace with tools for data scientists; and ability to create and host secure data services for published data sets.

Data services are used to expose the datasets over Restful web services. The workspaces comprise a VM or a container preconfigured with client access tools for the data lake and analytics libraries of choice installed. Native secure protocols are used in the configuration of security service in HDA to provide authentication and authorization for JDBC/ODBC or any other native data access protocols.

Figure 5:
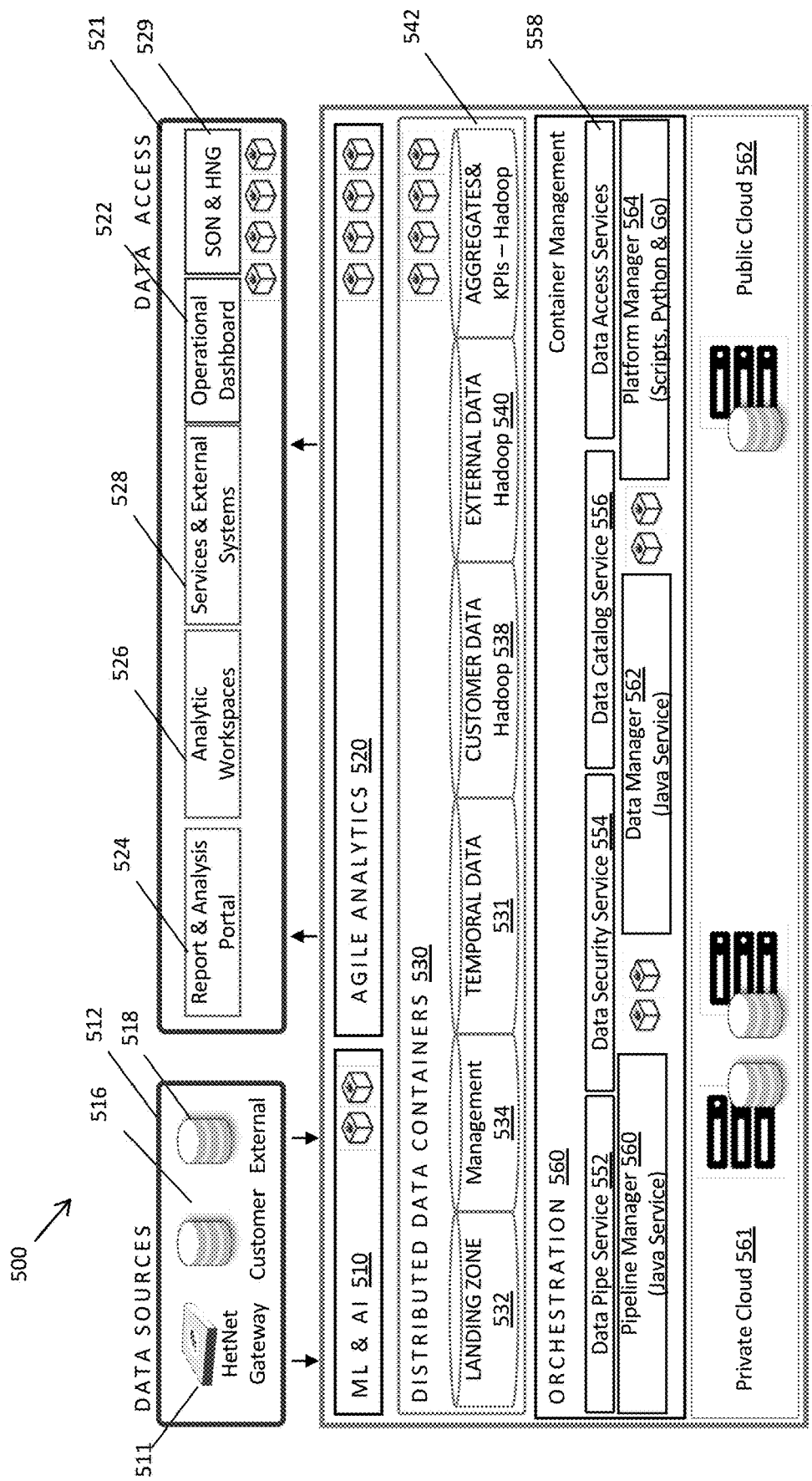
FIG. 5 depicts a diagram of an HDA technology stack, in accordance with some embodiments.

The HetNet Data Analytics (HDA) Technology Stack 500 is shown in FIG. 5, and includes data sources 512, data access 521 and the data lake. The data sources include the HetNet gateway 511, customer data 516 and external data 518. Data access 521 includes a report and analysis portal 524, analytic workspaces 526, services and external systems 528, an operational dashboard 522 and SON and HNG 529.

The data lake is shown and includes an ML and AI models 510 and Agile Analytics element 520. Also shown are distributed data containers 530, which includes landing zone data storage 532, management storage 534, temporal data storage 531, customer data storage 538, external data storage 540 and aggregate and KPIs storage 542.

The orchestration section 560 includes a data pipe service 552, a data security service 554, a data cataloging service 556 and data access services 558. Also shown are a pipeline manager 560, a data manager 562 and a platform manager 564. A private cloud 561 and a public cloud 562 are also shown.

In one embodiment data gathering is provided by way of a data pipe provisioning Application Programming Interface (API). The API generates data stream flow definitions, creates sinks, writes data to sinks, updates data catalog, associates security descriptors and generates process flow. The API includes data pipe configurations to collect raw HNG counters and stats out-of-box. The API further includes the ability to provision data feeds from external sources including customer databases as well as the ability to inject in-line processing in data pipe. The data gathering includes an elastic platform to execute data ingestion process, provides fault detection and notification data ingest flows and administration and auditability of data ingest flows.

The creation and administration of analytic workspaces include the ability to generate templated workspaces with compute, storage and tools from a resource pool. Also provided is the ability to run workspaces in production or development mode and the ability to teardown workspaces on-demand releasing resources to the pool. Development workspaces allow users to provision data sources securely from data catalog and/or bring data from external sources as well as the ability to provision data analytics tools and libraries within workspace, and the ability to share analytics results from workspaces. Production workspaces provide the ability to share data sets securely from the data lake with external processes, the ability to execute models or KPI calculations or generate reports in a timely manner, and post processing results for downstream processing. Production workspaces also permit ML model pipelining and execution in data lake and monitoring of workspace and processes to meet SLA.

Operations provides reports and dashboard generation. This includes the ability to choose and associate processed data sets to be used for report generation, the ability to include report generation and distribution engine, and the ability to publish reports or BI components to the reporting portal. The processed data set access API provides the ability to auto-generate secure rest service API to access data sets from the lake. Also permitted are DAG-based process execution for KPIs, processed data sets and running AI/ML models including the ability to be included in the microservices executing in HDA or outside. An analytics model publication API provides the ability to generate runtime code and data configuration from ML/AI models and the ability to create and deploy containerized app from ML/AI models, as needed.

Figure 6:
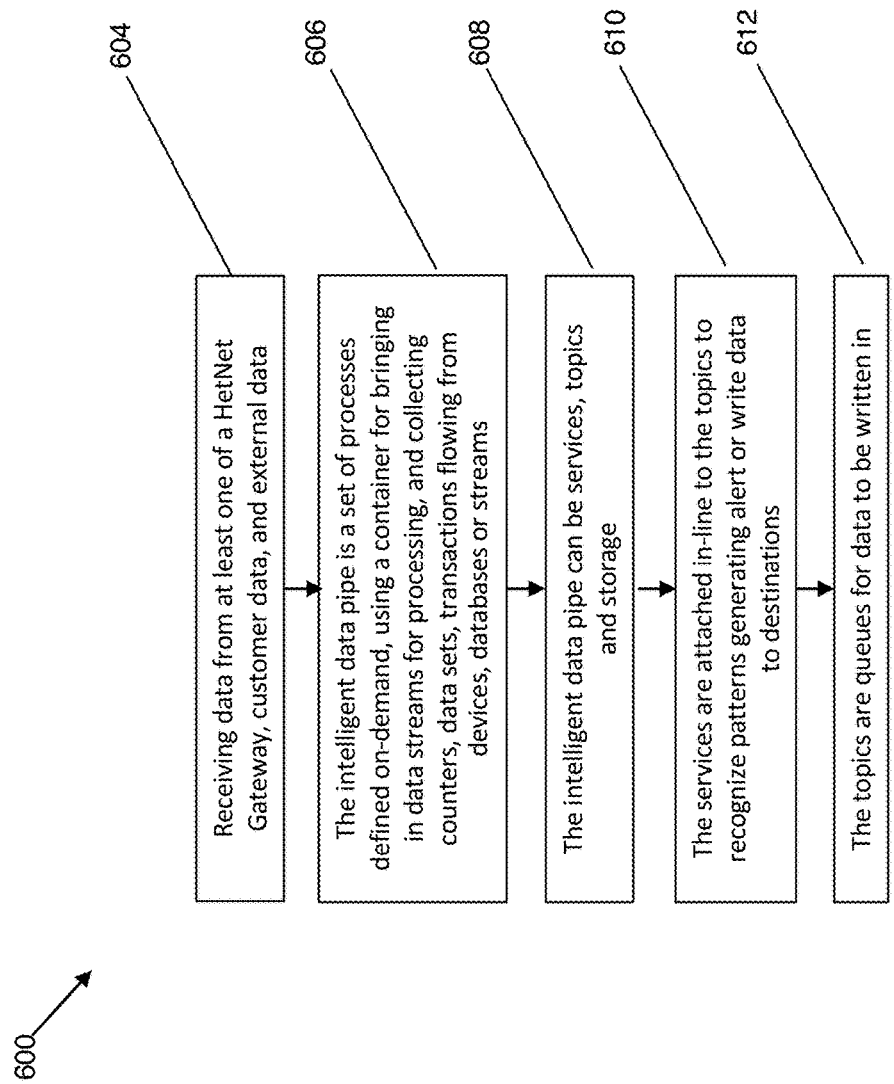
FIG. 6 is a flowchart for an intelligent data pipeline, in accordance with some embodiments.

Various flowcharts of particular embodiments are depicted in FIG. 6 and followinbg. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language or hardware implementation. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 6A and 6B, a particular embodiment of a method for providing data analytics 600 is shown. Method 600 begins with processing block 604 which discloses receiving source data from at least one data source at a Hetnet Data Analytics (HDA) data lake from an intelligent data pipe permitting source data to be presented in real time. This can be achieved by using an intelligent data pipe disposed between the source data and the data lake. As shown in processing block 604 the source data is received from a HetNet Gateway, customer data, or external data.

Processing block 606 shows wherein the intelligent data pipe comprises a set of processes defined on demand, and using a container for bringing in data streams for processing, and for collecting counters, data sets, transactions flowing from devices, databases or streams. Processing block 608 recites wherein the intelligent data pipe comprises services, topics and storage. A container may be preconfigured with client access tools for the data lake and may have analytics libraries installed.

Processing block 610 discloses wherein the services are attached in-line to the topics to recognize patterns generating alert or write data to destinations. Processing block 612 shows wherein topics comprise highly available queues for data to be written to.

Figure 7:
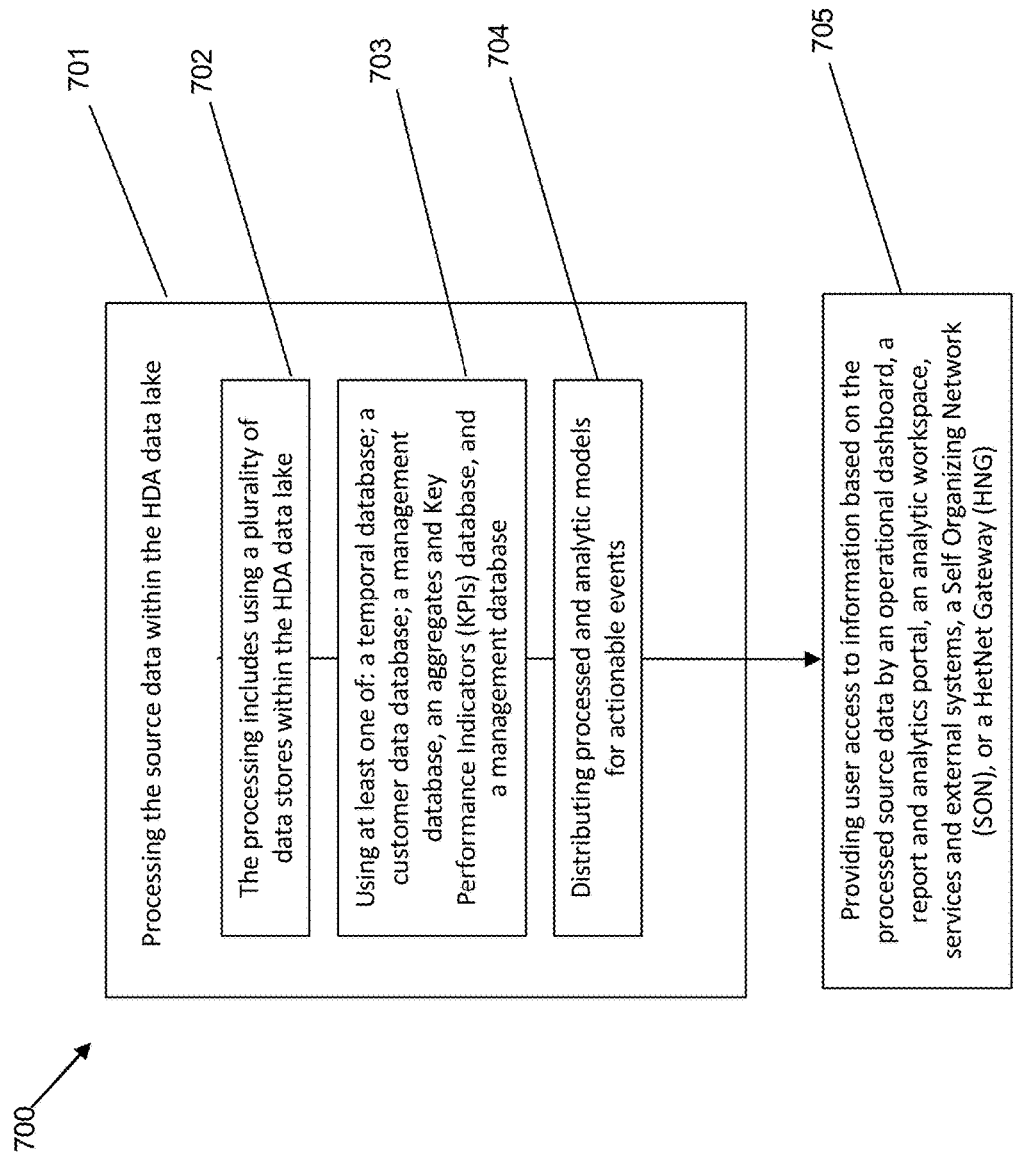
FIG. 7 is a flowchart for processing data within an HDA data lake, in accordance with some embodiments.

Referring to FIG. 7, further steps occur when the intelligent data pipe outputs data to the HAD data lake. Processing block 701 recites processing the source data within the HDA data lake. Processing block 702 discloses wherein the processing uses data stores within the HDA data lake. Processing block 703 shows wherein the data stores include: a temporal database; a customer data database; a management database, an aggregates and Key Performance Indicators (KPIs) database, or a management database. Processing block 704 recites distributing processed and analytic models for actionable events.

Once processing is completed at the HDA data lake, data is available for immediate use by users. Processing block 705 discloses providing user access to information based on the processed source data using an operational dashboard, a report and analytics portal, an analytic workspace, services and external systems, a Self Organizing Network (SON), anord a HetNet Gateway (HNG).

Figure 8:
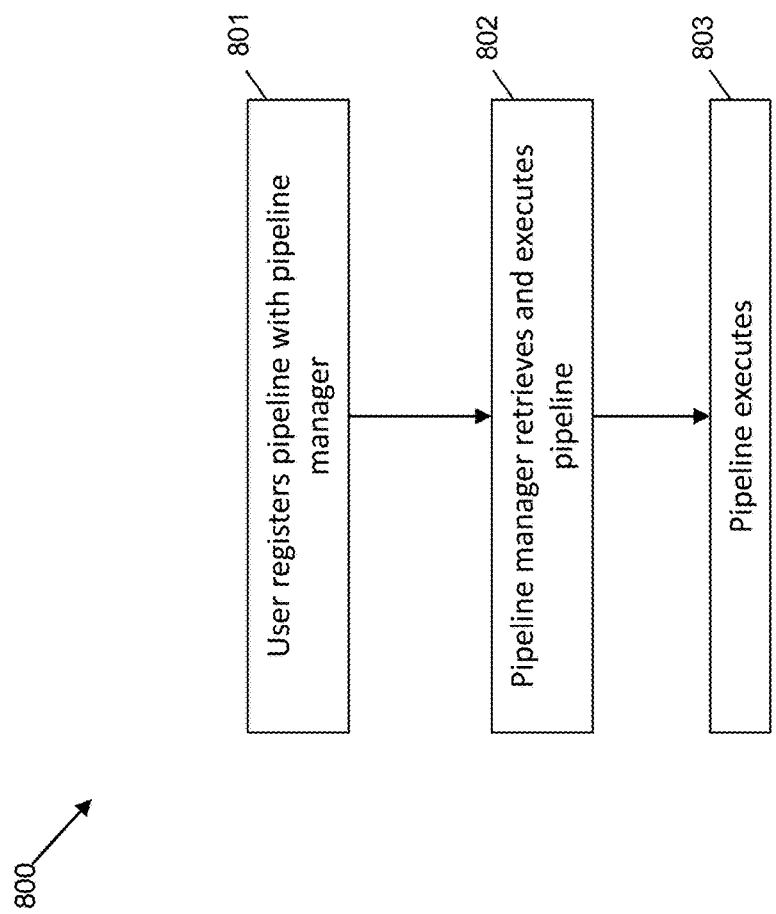
FIG. 8 is a flowchart for registering pipelines in an intelligent data pipeline, in accordance with some embodiments.

Referring to FIG. 8, FIG. 8 shows a process for registering a pipeline in some embodiments of the intelligent data pipe. Each data processing step requires that a process be created; at block 801 the processes are registered with the pipeline by a user, perhaps by entering commands in a manual configuration file written in XML or YAML, to enable a container to be created. The configuration of the container may include: input data sources; output data sources; input and output data formats; processing steps to be performed; as well as tags for: verification/security; versioning; mod date; access control lists for the pipeline; introspection; hooks for additional processes; execution priority of the process, etc. Examples of pipelines could include enrichment processes such as "swap customer ID with customer name" for greater human readability, or transformation processes such as "arbitrarily combine two columns of data," "add a column of data," "change a date format," etc. The power of the data pipe is the composability of multiple data commands that, when combined, allow the creation of a customized query directly on the live data without the difficulty of having to perform ETL, data normalization, etc.

At block 802, the pipeline manager, upon receipt of appropriate data, looks up and executes the pipeline as specified in the registered configuration. It is worth noting that a digital contract or schedule, etc. can be used to determine how often to run and how often to check. Scheduled, on-demand, and on-demand (with a specified latency) are three options. At block 803, the pipeline executes. The processing steps are attachable, so that subsequent transforms can be added.

Figure 9:
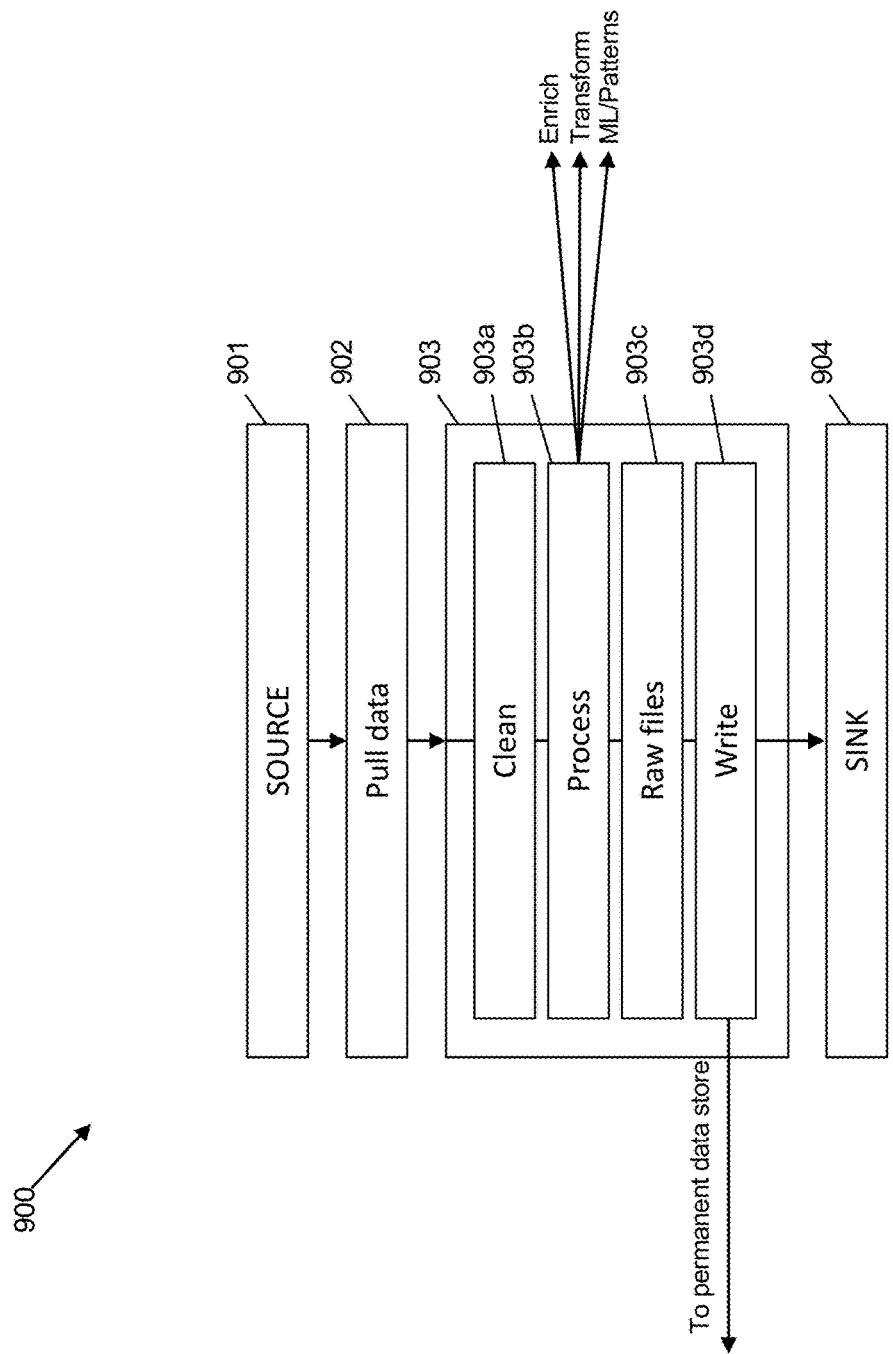
FIG. 9 is a flowchart showing execution of an individual containerized process, in accordance with some embodiments.

FIG. 9 is a flowchart showing execution of an individual containerized pipeline process, in accordance with some embodiments. Process 900 is shown, representing an individual pipeline process. At step 901, a source is passed to the individual pipeline process. This source could be a filehandle, a pipe, a network data stream, etc. At step 902, the data is pulled from the data source. At step 903, processing of the data occurs as specified in the configuration of the pipeline. As shown, a data cleaning step 903a, a data processing step 903b, a raw files preservation step 903c (to save the raw data for later use), a write step 903d (for copying the raw files and/or the processed data to the permanent data store) are shown. Processing 903b may include a wide variety of steps, such as enrichment, transformation, ML/pattern recognition, etc. At step 904, the data is output from the pipeline to the designated sink. The designated sink may be identified in the configuration or may be dynamically computed; this may depend on the business use case, for example, real-time analytics or data that requires aggregation may be output to an in-memory database for subsequent speedy processing, while measurement report data that is meant for ingest by an ML or offline analysis process can be output to another slower system or to an appropriate database such as a time-series database.

Figure 10:
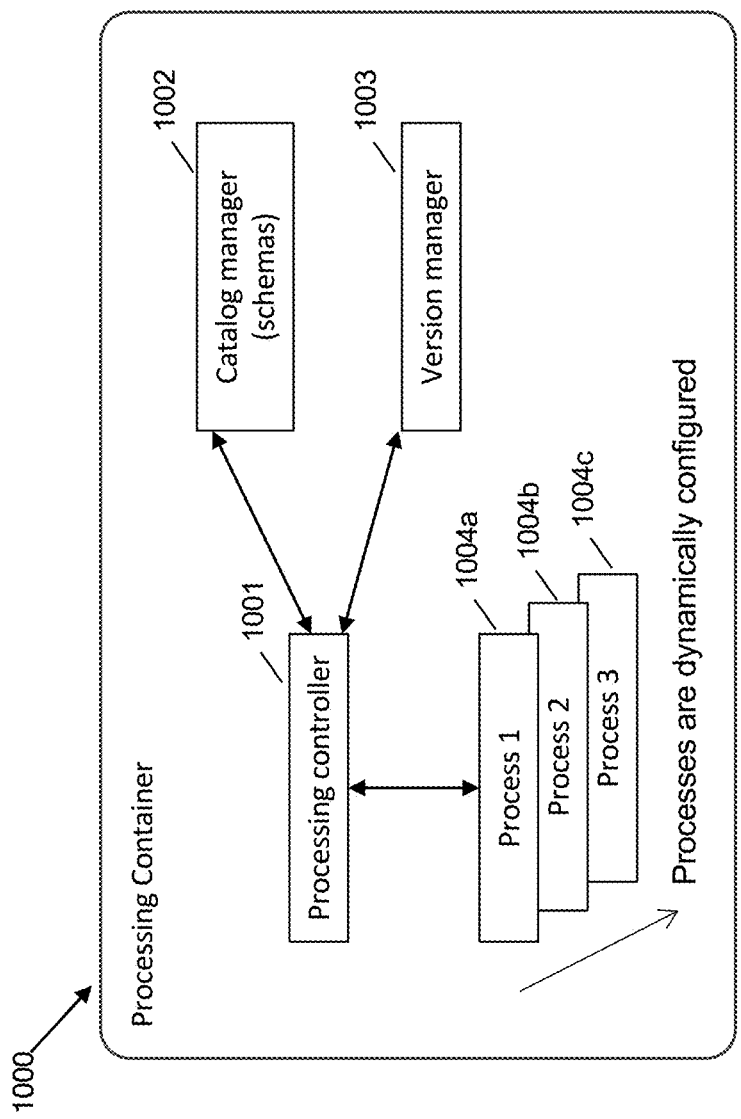
FIG. 10 is a schematic diagram showing a processing container, in accordance with some embodiments.

FIG. 10 is a schematic diagram showing a processing container, in accordance with some embodiments. Processing container 1000 includes processing controller 1001, which is coupled to catalog manager 1002 (which stores schemas for describing the data that is handled by the processing container) and version manager 1003. Catalog manager 1002 ensures that each pipeline process uses the right metadata and assists processing controller 1001 in identifying appropriate pipelines for given input data. Version manager 1003 ensures that each pipeline executes the most current version of itself; with streaming data it is possible to replace a currently-executing version of a pipeline with a new version of the pipeline for processing new data, without terminating execution of the pipeline against previously-received data. Processes 1004a, 1004b, 1004c are dynamically created and configured by the controller 1001, and may be organized in a chain or hierarchy, or in a tree or various other topologies as needed, etc., usually with at least one source and one sink.

Figure 11:
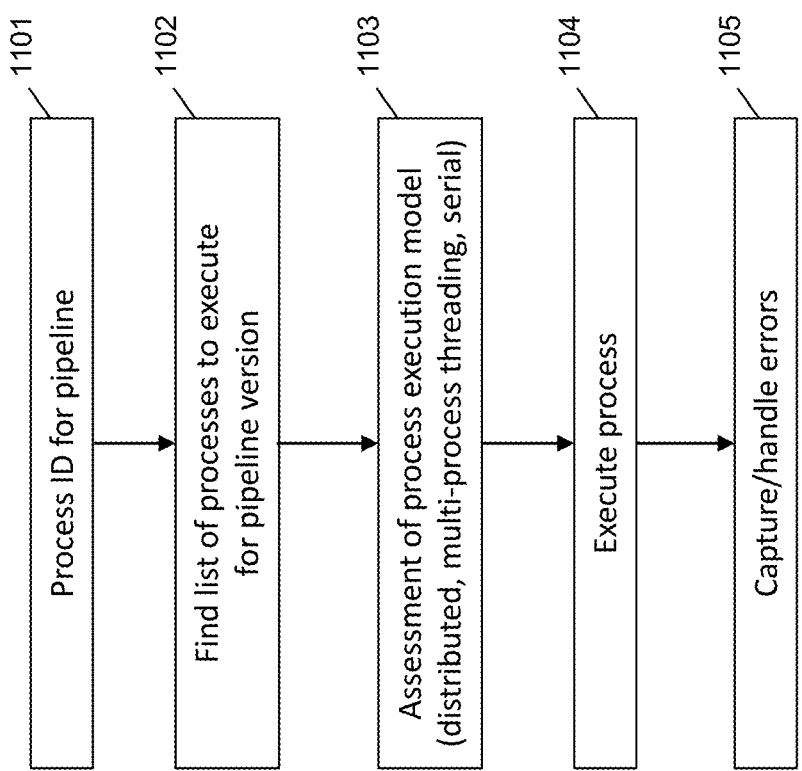
FIG. 11 is a flowchart of a containerized process management method, in accordance with some embodiments.

FIG. 11 is a flowchart of a containerized process management method, in accordance with some embodiments. At step 1101, incoming data is identified and used to identify a pipeline. At step 1102, At step 1102, a list of processes to be executed for the pipeline version is identified. At step 1103, an assessment of the process execution model is performed.

Briefly, the process execution model can be: distributed; multi-process threaded; serial; etc. This is related to the hierarchical or chained topology of processes. In some instances it may make sense to perform multiple steps in serial, which may each be handled by its own container. In other instances, it may make sense to split up the data stream among multiple containers so that data is processed in a round-robin fashion quickly, and recombined, e.g., parallel processed. This flexibility is enabled by the use of containerized processes, and by the use of cloud infrastructure, which can be spun up and down at will depending on need. This allows for real-time data to be made available to the analytics interface, even as data is also simultaneously or in parallel written to the permanent data store, which is a capability not heretofore possible.

At step 1104, the process is executed. At step 1105, errors are handled.

Figure 12:
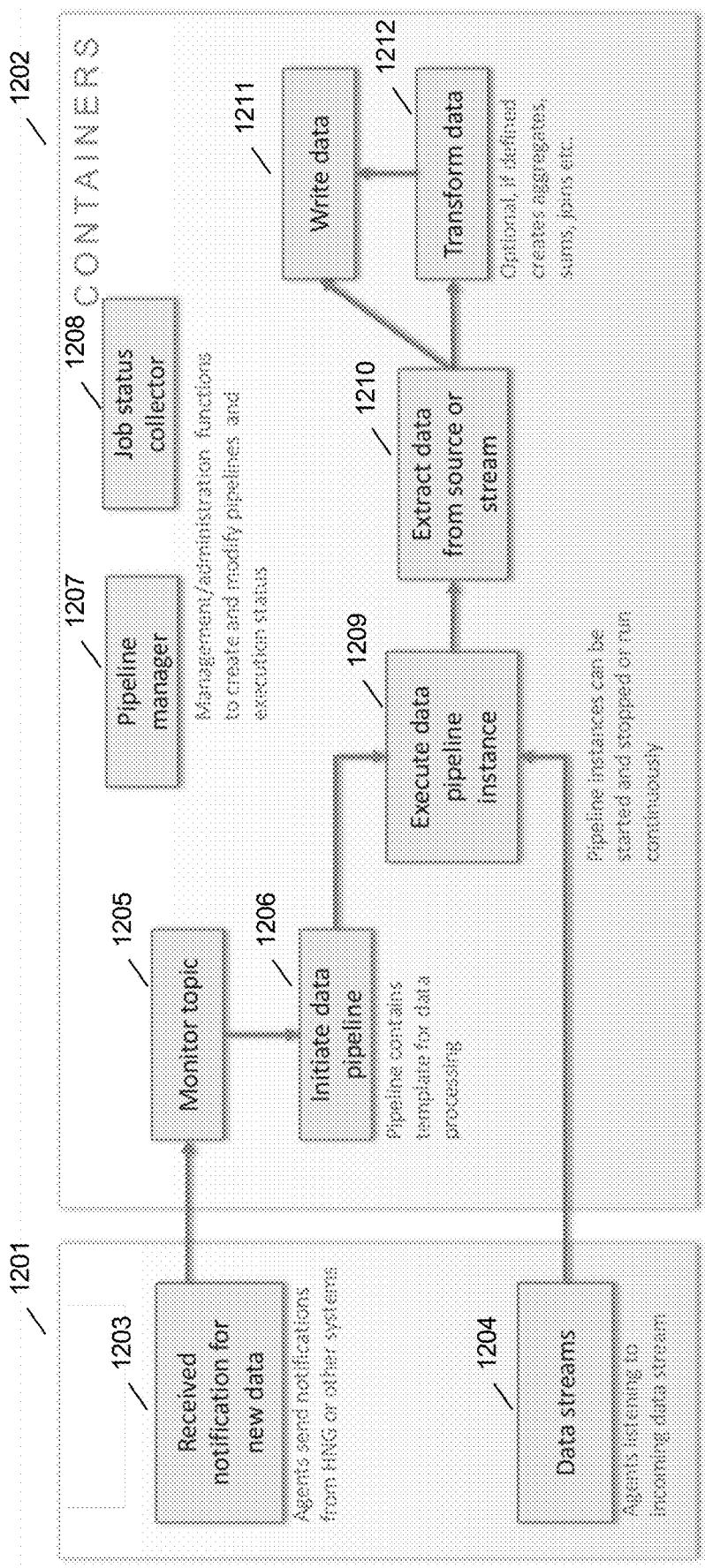
FIG. 12 is a schematic diagram of a data pipeline, in accordance with some embodiments.

FIG. 12 depicts a simple flow how a micro-batch pipeline process flow takes place. Data sources 1201 are provided, with agents 1203 and 1204 located in different parts of the system. Processes 1202 are containerized and located in the cloud infrastructure. Incoming data is made available periodically. When the data is made available, for example when a notification of new data is received at 1203 or when incoming data arrives on an open data stream at 1204, the processing elements comes to life and process the data. After processing completes the pipeline processes are turned off until next. The ingest system, which could use Kafka in some embodiments, in this case is used for two purposes, (1) to receive an event when data is available for processing and then (2) to host the data that needs to be processed. A simple client 1205 connected to agent 1203 monitors for the event in a topic indicating that a new set of data is available for processing.

Once that event is received, at step 1206, a pipeline initiation process orchestrates a process event bringing the data processing pipeline to life. Once the data pipeline is active, at 1209, it consumes data from the source, 1210. At that point two parallel processes in pipeline are activated, one transforming the data, 1212, to a desired format and the other, 1211, writing the raw data to a disk location. The output of the transformation process finally writes the data back to a second designated location holding the process data.

During execution of this pipeline, processing statuses are from the logs by the offline processes marked as Pipeline Manager 1207 and Job status collector 1208 so that system administrators can see the processing status of the system and any errors. Each data pipelines deployed in the system has a versioning control to track the processing needs. New versions of can be deployed or retracted back to previous in case of errors.

Design advantages of this design include: pipeline supports parallel execution of tasks while the data is still present in the system memory; loosely coupled processes that defines a pipeline an be modified and enhanced without significant code change; new processing can be introduced within the pipeline without impacting the significant processing times; independent processing components can scale horizontally to reduce processing load; resources are used from the pools and returned back when done without blocks or reserves.

Further Embodiments

In some embodiments, a cloud-scale adapter framework designed to bring data into base platform from external sources. The gateway layer consists of pre-build adapters designed to communicates with the telecom and wireless devices the adapter exposes data services to fetch data. Some devices can expose an control interface a control API for analytics process to programmatically adjust settings. Cloud agents are gateways that enables data lake to access data from Internet services or customer databases.

In some embodiments, a distributed data lake could be provided. "Distributed Data Lake" is a design principle: in an Operators network a data lake can be instantiated at anywhere so that data processing can be done close to the collection point. It is expected that every data lake instance in the operators' network works collaboratively so that analytics user does not feel where the data processing is happening. All components that build data lake must be software, instantiated through orchestration, self-monitored for load. So, optimal platform size can be determined dynamically. Local data lake must be optimized to meet local data processing needs, data volume, data type and data verity. Data lake platforms should be designed to meet the sizing needs. Operators may choose to deploy multiple data lake at different locations with different footprints of data lakes as determined by the processing needs of the location. However, the analytics user should not see query processing bottlenecks while trying to access from various distributed data lakes. During installation of a data lake, the operator can choose from a list of optional services to use. Consider classifying data lake services as essential and optional. This applies to all software platforms such as Hadoop, Kaflka, Cassandra, Redis etc., available pipelines to bring data for storage. The installer during installation or after installation choose from the list of optional services to add to data lake. Compute, storage and network resources in the data lake are shared resources. Every process in data lake should be designed to release all possible unused resources back to the pool. While designing service footprints consider minimum amount of resources that will be required for operation. For example, a Kafka cluster requires a minimum of 3 instances to operate and during peak processing times it may require 5 instances. Kafka platform design should handle the cluster pool resource requirements.

The foregoing discussion discloses and describes merely exemplary embodiments of the present invention. As will be understood by those skilled in the art, the present invention may be embodied in other specific forms without departing from the spirit or essential characteristics thereof. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

The above-described features and applications can be implemented as software processes that are specified as a set of instructions recorded on a computer-readable storage medium (also referred to as computer readable medium). When these instructions are executed by one or more processing unit(s) (e.g. one or more processors, cores of processors, or other processing units), they cause the processing unit(s) to perform the actions indicated in the instructions. Examples of computer readable media include, but are not limited to, CD-ROMs, flash drives, hard drives, RAM chips, EPROMs, etc. The computer-readable media does not include carrier waves and electronic signals passing wirelessly or wired connections. Code may be written in any combination of programming languages or machine-readable data formats, each suitable to its particular application, including but not limited to: C, C++, Java, Python, Ruby, R, Lua, Lisp, Scala, JSON, JavaScript, YAML, XML, HTML, etc. Services may be RESTful and may be implemented using generic hooks, including over HTTP, HTTPS, SCTP, IP, TCP, JSON, JavaScript, etc., as well as via inter-process communication on one or more real or virtual machines or containers, e.g., IPC, shared memory, shared filesystem, UNIX pipes and the like. A Linux or POSIX environment may be used. Containers may be Docker, Jetty, Tomcat, Wildfy, Springboot, LXD, unikernels, OpenVZ, RKT, Windows Server, Hyper-V, or any other type of container, or may be, in some embodiments, virtual machines or images, etc. Network access may be relied upon or may be avoided, in various embodiments. A networking fabric may be provided among the different containers, in some embodiments. As is well-known, the benefit of using cloud infrastructure is that it is simple to mix heterogeneous resources and to scale services up or down based on load and desired performance.

In the specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronics systems, define one or more specific machine implementations that execute and perform the operations of the software programs.

A computer program (also known as program, software, software application, script, or code) can be written in any form of programming language, including compiled or interpreted languages, declarative or procedural languages, and it can be deployed in any form, including as a standalone program or as a module, component, subroutine, object, or another unit suitable for use in a computing environment. A computer program may, but need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored in the circuit itself.

As used in this specification and any claims of this application, the terms "computer", "server", "processor", and "memory" all refer to electronic or other technological devices. These terms exclude people or groups of people. For the purpose of the specification, the terms display or displaying means displaying on an electronic device. As used in this specification and any claims of this application, the terms "computer-readable media" and "computer readable medium" are entirely restricted to tangible, physical objects that store information in a form that is readable by a computer. These terms exclude any wireless, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, or any other available monitor types, for displaying information to the user and a keyboard and a pointing device, e.g., mouse or trackball, by which the user can provide input to the computer. Other kinds of devices can be used to provide for interaction with a user as well; for example, feedback provided to the user can be any form of sensory feedback, e.g., visual feedback, tactile feedback, or auditory feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication network include a local area network ("LAN"), an inter-network (e.g., the Internet), and peer-to-peer networks (e.g., ad-hoc peer-to-peer networks).

The subject matter described in this specification can be implemented using client-side applications, web pages, mobile web pages, or other software as generally known in the art and that would be usable to end-user customers (for community self-managed RAN apps) and/or mobile operator end users. The subject matter could alternately be delivered or implemented using an API, such as a SOAP API, a JSON API, a RESTful API, in lieu of or in conjunction with a direct end-user interface. The subject matter could use messaging queues, webhooks, server-side containers, or any other technology known in the art.

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purpose of displaying data to and receiving user input from a user interacting with the client device). Data generated at the client device (e.g., a result of the user interaction) can be received from the client device at the server. Any database could be used (SQL, NoSQL, temporal, key-value, etc.). Any container orchestration technology (Kubernetes, Docker Swarm) could be used.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in singular is not intended to mean "one and only one" unless specifically so states, but rather "one or more." Unless expressly stated otherwise, the term "some" refers to one or more. Pronouns in the masculine (e.g., his) include the feminine and neuter gender (e.g., her and its) and vice versa. Headings and subheadings, if any, are used for convenience only, and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations or one or more configurations. A phrase, for example, a configuration may refer to one or more configurations and vice versa.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, cloud topology could vary and public and private cloud services could be mixed; certain services could be provided by containers while other services could be provided by dedicated machines or virtual machines or virtual network functions (for example, a data sink could be a traditional billing server); wireless network topology can also apply to wired networks, optical networks, and the like; etc. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

What is claimed is:

1. A method for performing computations on data at an intelligent data pipe en route to a data store, comprising:
receiving metadata regarding a data stream from a data source;
performing an analysis of the metadata at a service orchestrator;
creating at least one container instance based on the analysis;
streaming the data stream from the data source to a data sink via the at least one container;
processing the data stream as it passes through the at least one container instance, by enabling a self-provisioned and configured platform to generate and execute data pipeline applications based on customer driven Service Level Agreements (SLAs), thereby enabling application-aware processing of data streams in real time prior to arrival at the data store;
wherein the intelligent data pipe includes topics comprising highly available queues for data to be written in; and
writing data to the topics from external sources or a data lake.

2. The method of claim 1, further comprising coordinating the at least one container instance using Kubernetes or Docker Swarm.

3. The method of claim 1, further comprising making a copy of the data stream en route from the data source to the data sink.

4. The method of claim 1, further comprising creating multiple container instances for processing the data stream.

5. The method of claim 1, wherein processing the data stream further comprises enriching the data stream or transforming the data stream.

6. The method of claim 1, further comprising creating container instances for data copying and for aggregate data processing.

7. The method of claim 1, further comprising deactivating the at least one container instance upon inactivity of the data stream.

8. The method of claim 1, further comprising selecting an appropriate data type of the data sink based on the metadata.

9. The method of claim 1, further comprising creating multiple container instances to split the data stream into multiple data streams and to perform processing in parallel of the split data stream, or to copy the data stream into multiple data streams and to perform separate processing of each of the multiple data streams.

10. The method of claim 1, further comprising enabling data replication and aggregate analytics data processing in parallel using multiple processing streams of the data stream.

11. The method of claim 1, further comprising making changes during processing to storage, compute, or networking needs of the at least one container instance based on the metadata.

12. The method of claim 1, further comprising composing an analytics data view in the pipeline in near-real time based on data records in the data stream.

13. The method of claim 1, wherein processing the data stream further comprises reformatting the data stream into another data format.

14. The method of claim 1, further comprising receiving the data stream via highly available queues.

15. The method of claim 1, further comprising performing pattern recognition of the data stream at the at least one container instance.

16. The method of claim 1, further comprising enabling snapshots, clones, QoS, compression, encryption, data tiering, replication, high performance, app snapshot, app clone, app deploy, scaling, backup, upgrade, or multi-tenancy at the at least one container instance.

17. The method of claim 1, wherein the metadata comprises a data stream source, a data stream sink, and a data type.

18. The method of claim 1, wherein the metadata indicates the data stream has a data type that is one of: flat file, Excel, CSV/JSON, Hive, JDBC data sources, Oracle, Microsoft, MySQL, IBM DB2, IBM Netezza, HP Vertica, SAP HANA, Teradata, Amazon AWS Redshift, Google BigQuery, Kafka streaming and cloud applications web services.

19. The method of claim 1, further comprising enriching the data stream with supplemental data from a second data stream, the supplemental data being human-readable data for interpreting the first data stream and the first data source.

20. A non-transitory computer-readable medium containing instructions which, when executed, cause a data storage system to perform steps comprising:

receiving metadata regarding a data stream from a data source;

performing an analysis of the metadata at a service orchestrator;

creating at least one container instance based on the analysis;

streaming the data stream from the data source to a data sink via the at least one container;

processing the data stream as it passes through the at least one container instance, by enabling a self-provisioned and configured platform to generate and execute data pipeline applications based on customer driven Service Level Agreements (SLAs), thereby enabling application-aware processing of data streams in real time prior to arrival at the data storage system; and wherein the intelligent data pipe includes topics comprising highly available queues for data to be written in; and writing data to the topics from external sources or a data lake.

\* \* \* \* \*